March 20, 1951     L. SMALL     2,545,676
DIAMOND IMPREGNATED DRESSING TOOL
Filed June 3, 1948
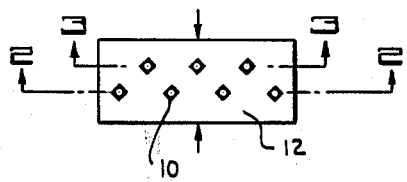
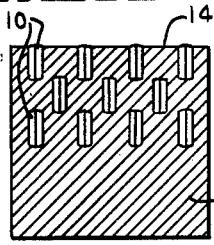 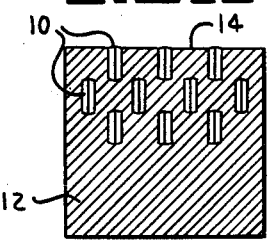
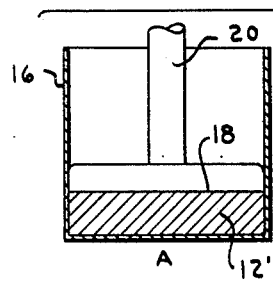 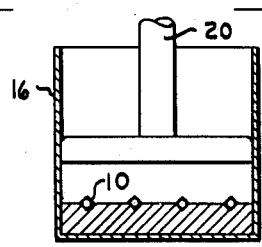 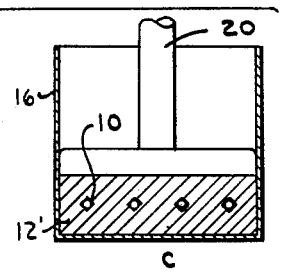
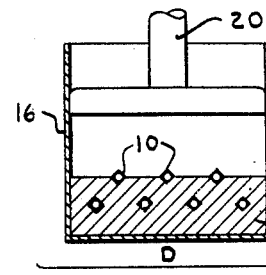 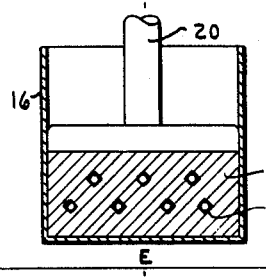 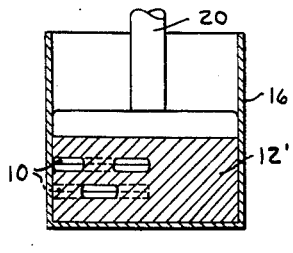
INVENTOR.
LOUIS SMALL
BY
ATTORNEY Patented Mar. 20, 1951

2,545,676

UNITED STATES PATENT OFFICE 2,545,676

DIAMOND IMPREGNATED DRESSING TOOL

Louis Small, Detroit, Mich., assignor to Service Diamond Tool Company, Ferndale, Mich., a corporation of Michigan Application June 3, 1948, Serial No. 30,878

6 Claims. (Cl. 51—309)

The present invention relates to an improved diamond impregnated dressing tool of the type comprising a cluster of industrial diamonds firmly supported within a metallic matrix, and to an improved method for the manufacture of such tools.

Important factors in the manufacture of such diamond impregnated dressing tools are both the shape and the disposition of the diamonds in the supporting matrix and the area of each stone exposed to the dressing operation in relation to the area of the supporting matrix. Relatively flat, longitudinal diamonds, arranged in parallel longitudinal alignment within the matrix with their sharp ends exposed to the dressing operation so as to present a small sharp area of dressing contact, are preferred.

The ratio between the area of each exposed diamond and the area of the supporting metal at the dressing surface of the tool is an important consideration and should be as small as possible for any particular stone. Thus, optimum support for the stone is provided, and a sharp exposed end of the stone at the dressing surface is assured. Also of importance is the uniform physical property of the matrix. The latter is assured by compacting the diamonds within a mass of a suitable powdered metal under relatively high pressure to form a solid briquette for the finished tool.

Prior to the present invention, it was common to manufacture diamond impregnated tools by arranging clusters of diamonds in vertical layers and in symmetrical patterns within a mass of a suitable loose metallic powder. Of course the diamonds were aligned originally in the loose powder with their long axes extended lengthwise of the mold, so as to approximate the desired longitudinal alignment of the diamonds in the final tool. Upon the application of pressure to the mold to compact the powdered metal, the diamonds were usually tipped out of their longitudinal alignment, so as to extend angularly or crosswise to the longitudinal axis of the finished briquette. As a consequence, when the diamond surfaces were exposed in the dressing operation, relatively large flat areas of the diamonds were exposed rather than the sharp end portions. The ratio of the metallic matrix in contact with the diamond at the dressing surface was thus frequently less than the desired optimum that would have been achieved if the diamonds had maintained their original alignment. The physical support for the diamonds was also reduced, and the wear on each diamond for a given dressing operation was greater than would have resulted if the sharp edge thereof had been exposed to the dressing operation. Accordingly, the economical manufacture of diamond impregnated tools of optimum efficiency was not possible in mass production by conventional methods.

An object of the present invention is to provide an improved method for the economical manufacture of a superior diamond impregnated dressing tool whereby the diamond dressing surfaces comprise sharp diamond ends.

Another object is to provide an improved process for the manufacture of a superior diamond impregnated tool whereby a multi-layer cluster of prelocated diamonds are impacted within a metallic matrix with their longitudinal axis in parallel alignment so as to assure a uniform support for each diamond and an optimum and uniform metal to diamond ratio throughout the effective length of the tool.

Other objects of this invention will appear in the following description and appended claims, reference being had to the accompanying drawings forming a part of this specification wherein like reference characters designate corresponding parts in the several views.

A preferred application of the process of the present invention achieves the above and other objects in the manufacture of a longitudinal rectangular type of diamond impregnated tool or briquette having a greater width than thickness. A layer of the metallic powder is first placed in a mold and lightly compressed to provide an essentially horizontal supporting surface for a layer of diamonds. The base of the mold is preferably horizontal and shapes one broad face of the final briquette. A layer of diamonds is then placed on the surface of the lightly compressed layer of powder with their longitudinal axes in the desired parallel alignment with the longitudinal axis of the mold and in accordance with a predetermined symmetrical pattern.

The first layer of diamonds is then covered with a second layer of powdered metal, which is also lightly compressed to provide an essentially horizontal supporting surface for a second layer of symmetrically arranged diamonds, staggered with the first layer, and with their longitudinal axes in parallel alignment with the diamonds of the first layer. The second layer of diamonds is then covered with a final layer of powder and the entire mass is subjected to a relatively high pressure which compacts the powdered metal into a solid briquette.

A feature of major significance in the present method is that the pressure for each compression operation is exerted perpendicularly to the longitudinal axes of the diamonds, and preferably perpendicularly to the plane of each layer of diamonds so as to compress the mass between its broad surfaces and in the direction of its relatively shallow thickness. The length of the compression stroke required for each compressing operation is accordingly reduced to a minimum and the flow or movement of the powdered metal in the mold during each compressing operation is also minimized.

Thus, by aligning the diamonds on the horizontal layers of powdered metal which are first compacted by a preliminary pressure directed perpendicularly to the longitudinal axes of the diamonds, and thereafter compressing the briquette by a final high pressure also directed perpendicularly to the longitudinal axes of the individual diamonds, the prelocated positions of the latter are maintained. All of the diamonds in the finished briquette will be aligned to present only their sharp cutting ends to the dressing operation. Likewise, by maintaining the axial alignment of the individual diamonds, it is possible to assure that each diamond will be supported by the same amount of metal, improving the reinforcement for the diamonds and providing a superior diamond impregnated tool.

It will be apparent to those skilled in the art that a limited degree of "fluidity" in the metallic powder under pressure will result in the exertion of pressures on the aligned diamonds in other directions besides perpendicularly to their longitudinal axes, even though the primary compression stroke is directed perpendicularly to the said axes. However, by subjecting the powder to preliminary compression in successive relatively shallow layers, with a layer of diamonds between each layer of powder, the resulting "flow" of the metallic powder and distortion of the axial alignment of the diamonds between the successive layers is reduced to a minimum in the final high pressure compressing operation.

A finished diamond impregnated tool and various steps in a preferred method for its manufacture by the process of the present invention are schematically indicated by way of example in the drawings wherein:

Fig. 1 is an end view of a diamond impregnated tool embodying the present invention.

Fig. 2 is a horizontal section taken in the direction of the arrows along the line 2—2 of Fig. 1.

Fig. 3 is a horizontal section taken in the direction of the arrows along the line 3—3 of Fig. 1.

Fig. 4 is a series of schematic vertical sectional views (A through E) through the compressing mold and perpendicularly to the axes of the diamonds, showing the tool in progressive steps of its manufacture.

Fig. 5 is a vertical section taken in the direction of the arrows along the line 5—5 of section E of Fig. 4.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to Figs. 1 through 3, a preferred form of a diamond impregnated tool is shown comprising the plurality of diamonds 10 arranged in two staggered layers within the metallic briquette or matrix 12. The diamonds 10 are preferably flat longitudinal industrial diamonds and are arranged with their longitudinal axes parallel with the longitudinal axis of the tool so as to present their sharp exposed ends at the dressing surface 14. As may be observed in Figs. 2 and 3, each layer of diamonds 10 comprises three staggered ranks. In the lower layer, the first rank comprises four diamonds, the second rank comprises three diamonds, and the third rank comprises four diamonds. Correspondingly staggered in the upper layer, the first, second and third ranks comprise three, four and three diamonds respectively. By the staggered arrangement shown, the ends of seven diamonds will always be exposed to the dressing surface 14. The parallel alignment of the longitudinal axes of the diamonds assures a uniform dressing characteristic of the tool as it wears in the course of repeated use.

In the manufacture of the tool, a suitable compression mold 16 is employed which has the interior dimensions of the desired final size of the finished briquette and which is adapted to withstand the high pressure exerted by the compression face 18 of the vertically movable plunger 20.

The completed tool or briquete is a longitudinal rectangular parallelepiped having the two plane broad surfaces parallel with the layers of diamonds 10 and spaced by the comparatively shallow thickness of the briquette. The base of the mold 16 is preferably horizontal and provides the form for one of the broad plane faces of the briquette. The compression plate 18 is parallel with the base of the mold 16 and is movable vertically so as to exert a pressure on material within the mold 16 and perpendicularly to the broad base of the latter upon downward movement of the plunger 20.

The progression of steps indicated in Fig. 4 are lettered A through E for future reference, the first step being at A, and the succeeding steps progressing to the right. As indicated in step A, a layer of powdered metal 12', of the type commonly employed in the manufacture of such diamond impregnated tools and which will eventually be compacted to the metallic matrix 12, is spread uniformly over the bottom of the mold 16 and lightly packed under a preliminary pressure by a downward stroke of the compression plate 18. Thereafter, as indicated in step B, the first or lower layer of diamonds 10 is placed on the horizontal upper surface of the lightly compressed powdered metallic layer 12' in the desired alignment for the completed tool, as indicated in Fig. 2.

The first layer of diamonds 10 is then covered by a second layer of the powdered metal 12', step C, which is similarly subjected to a premilinary light compression as described in step A. By virtue of the preliminary compression of the first metallic layer 12', the latter is undisturbed during the second preliminary compression operation of step C, and the diamonds 10 supported on the first layer 12' remain undisturbed in their axial alignment as the second layer 12' is compressed thereon in step C.

In step D, the second layer of diamonds 10 is arranged on the horizontal top surface of the second lightly compacted layer of powdered metal 12' in the alignment desired for the finished briquette, and as indicated in Fig. 3. The second layer of diamonds 10 is then uniformly covered by a third layer of powdered metal 12", and the entire mass within the mold 16 is subjected to a final high pressure by a downward stroke of the plunger 20, step E, which compacts the powdered metal 12' into the solid supporting matrix 12 and completes the diamond impregnated tool. Upon exposing the cutting edges of the diamonds 10 at the dressing face 14, the tool is ready for operation.

The preliminary compression of the layers 12' provides a comparatively firm supporting surface for each of the layers of diamonds 10 and also densifies the layers 12' sufficiently so that very little compression movement of the plate 18 is required for the final high compression operation of step E. By exerting the primary compression force against the shallow thickness of the briquette, the overall compressional movement is further minimized, since it is apparent that the compressional movement will be proportional to the thickness of the material between the base of the mold 16 and the compression plate 18. By thus minimizing the extent of flow or movement of the metallic matrix 12 in the final compression operation, the diamonds 10 remain undisturbed in their desired axial alignment.

In the preferred application of the present invention, the diamonds 10 are preferably relatively long narrow stones of less than one-quarter karat. In the manufacture of briquettes of the type shown comprising two layers of diamonds of three ranks each, it has been found satisfactory to use five grams of powdered metal 12' for the first layer, three grams for the second layer, and four grams for the final layer. By subjecting the diamonds to compression essentially perpendicularly to their longitudinal axes, it has been found that the diamonds 10 are not thrown out of their axial alignment in the compression operation. Thus, diamond dressing surfaces comprising sharp ends with a minimum area of contact for the dressing operation are assured.

By the staggered arrangement shown, seven diamonds 10 will be exposed at all times to the dressing operation. However, it will be apparent that the method of the present invention is readily adaptable to the manufacture of diamond impregnated tools of other sizes and shapes as desired, having a greater or smaller number of impacted diamonds in two or more layers and with more or less than three ranks of diamonds in each layer.

By the foregoing, I have provided an improved method for the manufacture of a superior multi-layered diamond impregnated tool which makes possible the maintenance of the axial alignment of the diamonds impacted within the metallic matrix and also permits the manufacture of such a tool having an optimum uniform ratio between the area of the supporting metal matrix for each diamond and the exposed cutting end of the latter at the dressing surface of the tool, and which also assures a uniformity of the tool and uniform support of each diamond throughout the length of the tool. Likewise, by maintaining the longitudinal axes of the diamonds in their proper orientations throughout the compressing operation, the dressing characteristic of the tool will not vary from layer to layer or from rank to rank as the tool is worn, as commonly occurs with the conventional diamond dressing tool.

Having thus described my invention, I claim:

1. A method of manufacturing a diamond impregnated tool and comprising the steps of embedding a plurality of diamonds in parallel axial alignment within a body of metallic powder and of thereafter compressing said body into a solid briquette by a compressional force directed primarily perpendicularly to the longitudinal axes of said diamonds.

2. A method of manufacturing a diamond impregnated tool and comprising the steps of lightly compacting a layer of metallic powder in a mold, of placing a layer of spaced diamonds in parallel axial alignment on said lightly compacted layer of metallic powder, of thereafter lightly compacting a second layer of metallic powder against said first layer by a compressional force directed primarily perpendicularly to the axial alignment of said diamonds, of placing a second layer of spaced diamonds on said second lightly compacted layer of metallic powder and in parallel axial alignment with said first layer of diamonds, and of thereafter compacting a third layer of metallic powder against said second layer by a compressional force directed primarily perpendicularly to the axial alignment of said diamonds, so as to compress said powdered metal into a solid briquette with the diamonds embedded therein.

3. The method as claimed in claim 2 and being further characterized in that said diamonds of one layer are aligned in staggered relationship with the diamonds in the adjacent layers to permit an optimum support by the surrounding metallic body.

4. The method as claimed in claim 2 and being further characterized in that the diamonds of each layer are arranged in a plurality of ranks extending perpendicularly to the longitudinal axes of the diamonds, and the longitudinal axes of the diamonds of each rank of each layer are staggered relative to the diamonds of the adjacent ranks either ahead or behind or in the other layer, the ends of the diamonds in one rank lying in a substantially common plane with the opposite ends of the diamonds in the next adjacent rank.

5. The method of manufacturing a multi-layered diamond impregnated tool and comprising the steps of embedding a plurality of longitudinal diamonds in said multi-layers and in parallel axial alignment within a body of metallic powder, the diamonds of each layer being arranged in a plurality of ranks extending perpendicularly to the longitudinal axes of the diamonds, and the diamonds of each rank of each layer being staggered relative to the diamonds of the adjacent ranks either ahead or behind or in the other layer, and of compressing said body into a solid briquette by a force directed primarily perpendicular to the longitudinal axes of said diamonds.

6. A method of manufacturing a multi-layered diamond impregnated tool and comprising the steps of lightly compacting a layer of metallic powder in a mold, of placing a layer of spaced longitudinal diamonds in parallel axial alignment on said lightly compacted layer of metallic powder, of thereafter alternately lightly compacting successive layers of metallic powder against the preceding layers of metallic powder by compressional forces directed primarily perpendicular to the axial alignment of the diamonds and of placing a layer of diamonds on each lightly compacted layer of metallic powder and in parallel axial alignment with the preceding diamonds until the desired number of layers of diamonds are in place, of thereafter covering the top layer of diamonds with a final layer of metallic powder, and of compacting the body of metallic powder and embedded diamonds into a solid briquette by a compressional force directed primarily perpendicularly to the axial alignment of said diamonds.

LOUIS SMALL.

REFERENCES CITED

The following references are of record in the file of this patent:

UNITED STATES PATENTS

| Number | Name | Date |
|---|---|---|
| Re. 22,373 | Benner et al. | Sept. 14, 1943 |
| 1,625,463 | Gauthier | Apr. 19, 1927 |
| 1,848,182 | Koebel | Mar. 8, 1932 |
| 2,150,034 | Melton et al. | Mar. 7, 1939 |
| 2,347,280 | Petrie | Apr. 25, 1944 |
| 2,368,473 | Keeleric | Jan. 30, 1945 |
| 2,435,916 | Windsor | Feb. 10, 1948 |